Jan. 3, 1928.　　　　　　　　　　　　　　　　　　　　1,654,824
F. B. MITCHELL
REPEATING AND STOPPING DEVICE FOR TALKING MACHINES AND THE LIKE
Filed Aug. 29, 1921　　　　4 Sheets-Sheet 1

Inventor
F. B. Mitchell,
By Marks & Clerk
Attys.

Jan. 3, 1928.  F. B. MITCHELL  1,654,824

REPEATING AND STOPPING DEVICE FOR TALKING MACHINES AND THE LIKE

Filed Aug. 29, 1921  4 Sheets-Sheet 2

Inventor
F. B. Mitchell,
By Marks & Clerk
Attys.

Jan. 3, 1928.  1,654,824
F. B. MITCHELL
REPEATING AND STOPPING DEVICE FOR TALKING MACHINES AND THE LIKE
Filed Aug. 29, 1921   4 Sheets-Sheet 3

Inventor
F. B. Mitchell,
By Marks & Clerk
Attys.

Jan. 3, 1928. 1,654,824
F. B. MITCHELL
REPEATING AND STOPPING DEVICE FOR TALKING MACHINES AND THE LIKE
Filed Aug. 29, 1921 4 Sheets-Sheet 4

Inventor
F. B. Mitchell
By Marks & Clerk
Attys.

Patented Jan. 3, 1928.

1,654,824

UNITED STATES PATENT OFFICE.

FRANK BOWLEY MITCHELL, OF HOVE, ENGLAND.

REPEATING AND STOPPING DEVICE FOR TALKING MACHINES AND THE LIKE.

Application filed August 29, 1921, Serial No. 496,362, and in Great Britain August 30, 1920.

This invention relates to talking machines and the like of the disc record type, with particular reference to automatic repeating and stopping devices therefor.

Records of the disc type vary considerably. Some records have a deep annular groove, others a raised ridge at the end and others are so made that when in use the stylus may run out of the end of the last sound groove.

Such variations in records give rise to difficulties in the way of devising automatic stopping and repeating devices which will be of general application, and it is the object of my invention to overcome such difficulties.

Also as records finish at varying distances from the centre I provide the reproducer or its connections with a continued inward feed after the reproduction is finished.

The use of an inward running groove or feed after the end of the record to actuate a brake is, of course, known. I now use this groove or inward feed to actuate my repeating apparatus.

According to this invention an inward travelling reproducer raising and repeating apparatus is caused to meet its actuating part mounted in a permanently located position in order to obtain an outward feed of the tone arm to the start position, where means are provided for gently replacing the stylus in the first sound grooves of the record for repetition and also to apply the brake.

In some forms I may use a tangential friction acting member of known form working on the surface of the record or table.

As an alternative I may use a projection (or projecting wall of a groove) on the record disc to actuate the tone arm lifting or stylus disengaging mechanism which is located under the table or in other suitable position and in this case the stylus does not run inwards from the last line of the record disc.

In order to obtain predetermined automatic repetition followed by automatic braking. I have an indicator controller member with two or more movements such as a ratchet wheel, for example, to turn one tooth each time the arm moves across the record.

Other novel features will be shown with reference to the following drawings, which show several forms of carrying out my invention:—

Figure 3 is a sectional elevation on the line 3—3 of Figure 2 while

Figure 7$^a$ shows an alternative slow fall device;

Figure 3:
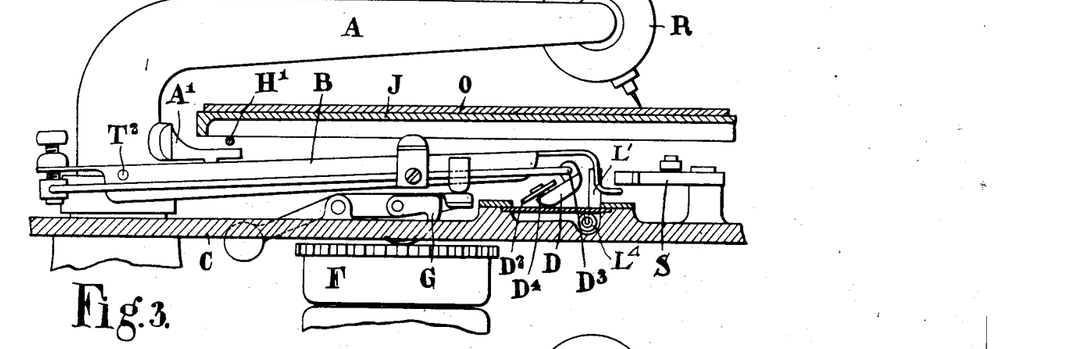
Figure 4:
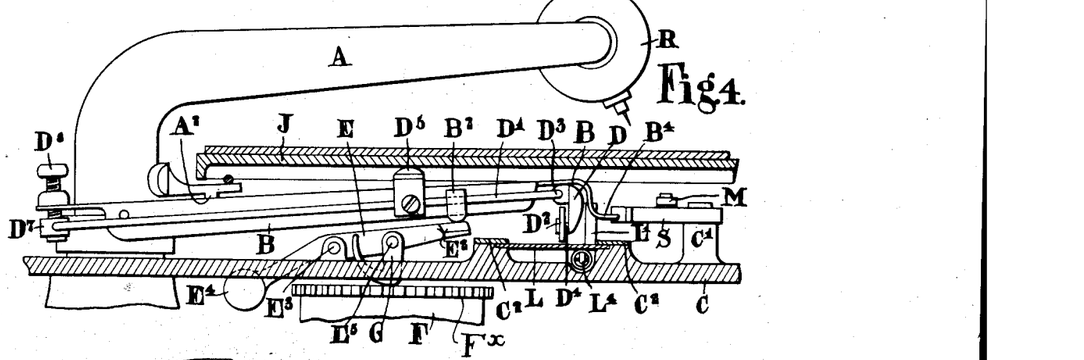
Figure 4 is a similar view but showing the parts in a different position.
Figure 5:
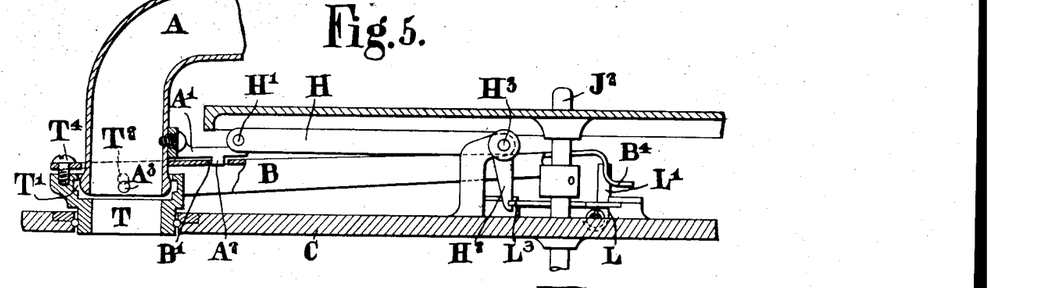
Figure 5 is a front elevation partly in section.

In carrying my invention into effect in the manner shown in Figures 1 to 5 and referring first to Figure 5, I mount a member T in a ball bearing in a bed plate C to rotate freely in a similar plane therewith. In the top part of the member T two bearing pins $T^2$ (also shown in plan in Figure 2) are fixed. An arm B is hinged to move vertically on these pins and has an adjustable set screw at $T^4$ to regulate the drop of the outer end $B^4$. The tone arm A is mounted with the usual vertical swivel or cross pins $A^3$ to work in an internal groove $T^1$ in the member T, forming the well-known joint capable of two-phase motion (vertical and lateral) but being capable of being locked to the member B against lateral movement thereon, by the extension $A^2$ entering the hole $B^1$ in the arm B, when the arm A is lowered into or near the stylus working position, as shown. The object of locking the arms A and B together is so that raising or lowering the arm B will also raise or lower the reproducer R.

At the outer end of the arm B, a cam acting wheel $D^2$ is mounted on a hinged leaf D by the pin $D^4$. The leaf D and wheel are so weighted as to hang normally in the manner shown in Figures 2 and 3, whenever it is free to move on its hinge $D^3$. The member D is not hinged direct to arm B but to the end of an arm $D^1$ which in its turn is hinged to arm B, as shown at $D^7$ (Figure 4), and is vertically adjustable by the screw $D^8$. On the forward end of arm B is a guide opening $B^3$ (Figure 2) for the arm $D^1$, cut in the bar $B^2$ which is fixed to the arm B.

The wheel $D^2$, when pushed into the vertical position shown in Figure 4, will lift the arm B and the reproducer, and will also allow free lateral movement thereof.

Figure 1:
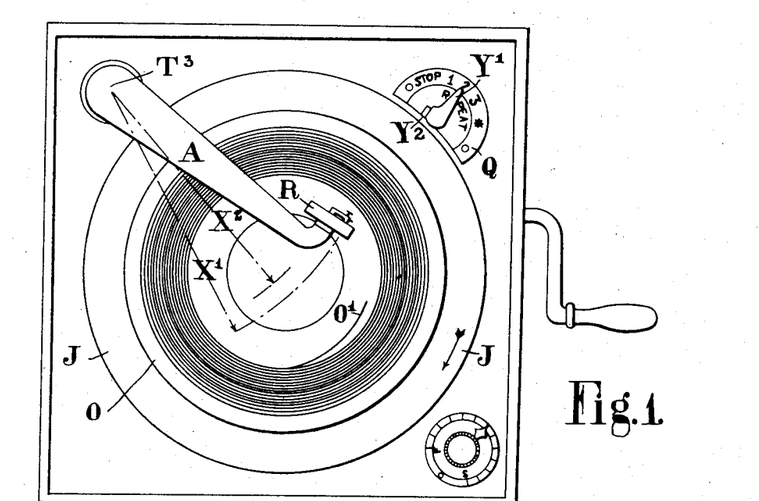
Figure 1 is a top view of a gramophone fitted with the apparatus shown in Figures 2 to 5, with a record disc in position.
Figure 2:
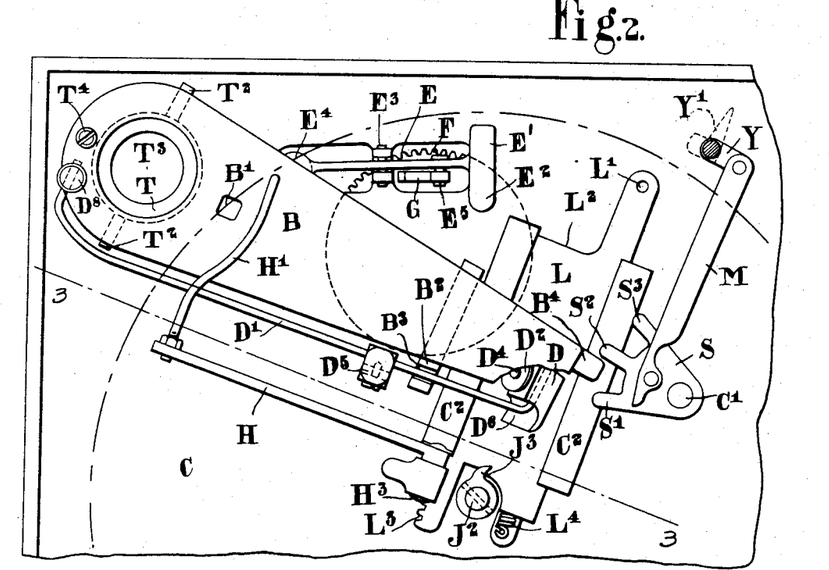
Figure 2 is a top view with the top plates and tone arm removed.

On the arm $D^1$ is a friction member or leather pad $D^5$, so that when the arm is thus raised, the pad will press on the under side of the record carrying turntable J, and being nearer the axis $T^3$ of the rotation of the arms than the turntable axis, the moving table will carry both arms B and A outwards, away from the record centre by tangential drag on the friction member, the turntable turning in a clockwise direction, as shown by the arrow, Figure 1, and the pressure being adjustable by the set screw $D^8$.

In order that the stylus shall be gently replaced to repeat a record, a rocking lever E is mounted on the pivot $E^3$ and carries a cam G pivoted at $E^5$, the cam being so weighted that when free it will always fall in one direction with the longest radius downwards. Under the cam is a reverse direction turning member which in this case consists of the head $F^x$ of the main spring box of the motor F. At one end $E^4$ of the rocking lever a weight is attached normally to raise the other end, which is provided with a rest surface $E^1$ with an inclined part $E^2$.

When the arms arrive at the out or record-commencing position, the part $B^2$ of the arm B rests on the slow fall acting surface $E^1$. This prevents the arms and stylus dropping suddenly as the pressure puts the cam G in contact with the slowly rotating member F and the arm can only be lowered as the cam G is turned by member F commencing as shown at G, Figure 4, and finishing as shown at G, Figure 3. All this time of slow drop the friction member $D^5$ would be dragging to stop the rotation of the table and would cause trouble by slowing it down, were it not for the fact that the hinged arm $D^1$ allows the friction member $D^5$ to fall out of contact with the disc, when the wheel $D^2$ runs over the end of the slide L at $L^2$ and only the arm B is supported by the slow fall member $E^1$.

When arms A and B are sufficiently lowered, the stylus again begins to reproduce and the tone arm moving in towards the record axis in the ordinary manner carries the arm B inwards with it, while the weight $E^4$ will raise the slow-fall member $E'$ and cam G.

The change of direction of the travel of the arms (at the end of a reproduction) is brought about as follows:—When the machine is working and the stylus and arms A and B are travelling inwards, the stylus reaches the last lines (inwards) of the record O, where it mounts the smooth part of the record (to carry the tone arm inwards) either by entering an inward running groove $O^1$ thereon or continuing to run inward by the tangential drag on the stylus. To get this tangential inward drag on the stylus the reproducer is mounted on a longer tone arm so that the distance $X^1$ (Figure 1) between the tone arm axis $T^3$ and the stylus point is greater than the distance $X^2$ between the tone arm axis and the disc centre, the result being that the tangentially dragging action of the turning record on the stylus pulls the tone arm inwards. In either case the tone arm travels inwards until the projection $D^6$ (Figure 2) meets the projection $J^3$ on the axle $J^2$, this axle in turning moving the cam wheel member D into the vertical position shown in Figure 4, thus putting the friction member $D^5$ in driven contact with the table J and raising the reproducer so that repetition will now take place.

When the arms A and B are returning to the start position, the roller $D^2$ is holding them up and holding the stylus off the record. The arms cannot rest on the slow drop surface $E^1$ until the cam wheel is put out of vertical support position shown in Figure 4 and allowed to hang out of action, as shown in Figure 3. If the plate L is moved outwards in its guides $C^2$, farther from the axle $J^2$, and fixed in a new position for a larger record, the arm B cannot fall on the slow drop member $E^1$ until it has also travelled farther out than before, because as stated it cannot fall until the wheel $D^2$ loses its support by overrunning the edge $L^2$.

Records are of different diameters, consequently the position of restart is a different distance from the axis $J^2$ for a different size record. The apparatus is automatically set for this purpose as follows:—To play a new record, the reproducer is grasped by the hand and put into action in the outer record grooves in the usual way. This operation will cause the arm B to move outwards at the same time and in moving out it will move the slide L out by the arm B pushing against the upright pin $L^1$, so that for a half inch larger record, the slide L is pushed out half an inch farther.

If the slide L is already out it would not require pushing out, but in changing records the slide always jumps back to the innermost position ready for being reset, upon the reproducer being brought over to the start position.

The slide L cannot be moved while the reproducer is down or during action, so that for each repetition the stop pin L¹ will remain in a fixed position, always stopping the out-throw of the arms at the same position for repetition, but directly the reproducer is lifted by hand off the record, the slide L is unlocked and is returned by its spring L⁴, and upon lowering the reproducer it is again locked in whatever position it may be in, so that a record would always repeat at the point on which the stylus was last put by hand.

The locking of the slide L is done as follows:—The slide is made to slide freely in the guide-ways C² (Figures 2 and 4) and has an upstanding stopping pin L¹ at the outer end. It also has a tension spring L⁴ to keep it in the inner position whenever it is liberated.

The member H (Figure 5) is a lever pivoted at H³ and adapted to be lifted at H¹ by the tone arm extension A¹ upon lifting the tone arm by hand. When lifted it takes the other end H² out of tooth or wedge contact by which the slide was held as shown, for example, at H², L³ in Figure 5. When the tone arm is again lowered the weight of the long arms H and H¹ again puts the locking parts in position. It is to be understood that the teeth L³ and the various parts associated therewith are so designed that any movement of the arm H² due to the automatic raising of the tone arm for repetition is not sufficient to cause the disengagement of the arm H² from the teeth L³ for unlocking the plate L.

A brake member Y¹ above the wood table (Figure 1) is attached through a vertical bearing to the arm Y under the wood table. A three-armed lever or quadrant S is pivoted at C¹ and connected to move in synchronism with the lever Y and arm Y¹, by the link M. The arm Y¹ is a hand setting member having a brake shoe Y² mounted over a graduated dial Q.

Supposing the arm Y¹ is placed at the point marked 3 on the dial Q, it will move the quadrant S round until the arm S³ (Figure 2) points towards the tone arm axis T³. The machine is started, and the record played once, when the arms A and B are actuated to lift and run outwards, as above described. While the arm B is moving outwards, the extension B⁴ will move the quadrant round one tooth, thus moving the indicator Y¹ to the point 2. The arm continues outwards, drops and returns inwards (to repeat the record). The lug B⁴ is now able to pass under the arm S², and does not move it. The arm B is again actuated to lift and run outwards, and now moves the arm S² round, bringing the indicator Y¹ to the number 1 on the dial. The next time arm B comes out, the third arm S¹ is moved, also moving the indicator to the brake position, that is, it now puts the brake shoe Y² against the edge of the turntable J and stops the machine automatically.

If the indicator arm Y¹ it put round to the star shown on the dial, the three arms S¹, S² and S³ are turned so far that the lug B⁴ can never touch them and repetition goes on indefinitely.

Figure 6:
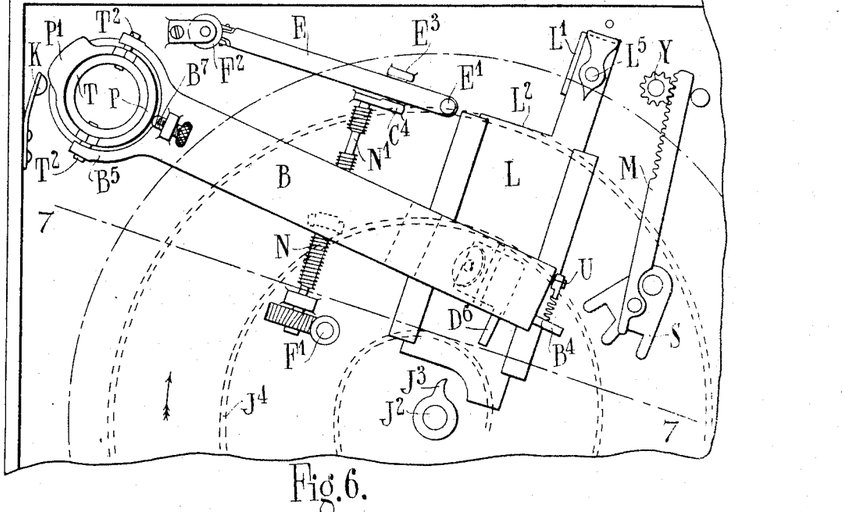
Figure 6 shows a plan, with the tone arm, turntable and top wood-work of the machine removed.
Figure 7:
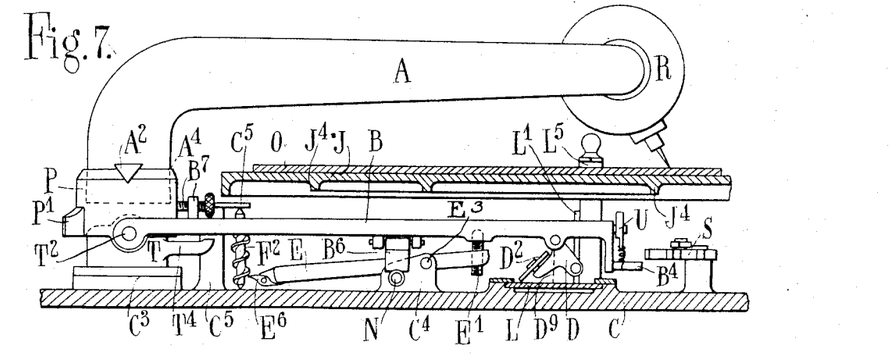
Figure 7 is a sectional elevation (on line 7—7, Figure 6) of the mechanism, including the tone arm, a record and the turntable.
Figure 8:
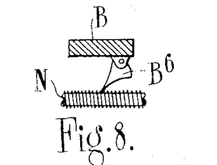
Figure 8 is a fragmentary view of the trip pawl; in this form the outward run of the tone arm to the start position for repetition is aided by the use of a threaded revolving spindle.

Figures 6 to 8 show a modification in which the outward repetition stop L¹ is hand set for different diameter records by simply pushing it against the edge of the record or by pushing the record against the stop L⁵.

The outward drive of the tone arm is "positive" by the spiral wall J⁴.

Two alternative slow fall actions are shown.

The action is as follows:—A cylindrically bored member T is mounted by a bearing C³ in the bed plate C. This bed plate is mounted on the top part of the machine motor (not shown) and is preferably below the main wood top plate or table of the casing.

Another cylindrical sleeve P is placed loosely over same and carries the tone arm A telescopically mounted therein at A⁴ restings on lugs A².

The fork B⁵ of the long arm B is passed around sleeve P and the members T, P and B are pivotally attached by the pivots T² so that both the tone arm and arm B have independent vertical hinge action. The bearing sleeve T carries a projecting lug T⁴ to hold up the arm B in its lowest position.

On the arm B is a set stop member consisting of a screw B⁷ to govern the vertical relation of the arm A to the arm B. By turning the screw B⁷, the height of the needle on the record can be regulated, i. e., the screw limits its fall while the arm A is quite free to be lifted.

The cam acting member D is arranged to act as shown in Figures 1 to 5, to lift the tone arm.

The run inwards (towards axle J²) of the tone arm after the end of the record to bring the arm lifting parts together is also the same, with the exception that the inward feed of the screw thread on the spindle N enables the stylus to surmount obstructions to the inward run.

For this purpose the screw is rotated by a slow or worm drive from the motor, shown at F¹, at such a speed that the screw thread will feed inwards at a speed equal to or less than the inward travel of the stylus (when on a record).

From the arm B hangs a knife-edged lever B⁶ (Figure 8) normally canted towards the bearing C⁴, by its own weight, arranged to act as a slipping ratchet pawl on the thread tops of the turning screw N, when the arm B is, during the operation of the machine, moved by the tone arm towards the table axis at a faster speed than the feed of the screw, but when the arms stop their inward travel, owing to the stylus meeting a deep ridge on the record at the end of reproduction or from other causes, the screw continuing to turn will catch up the pawl B⁶ and push it gradually into the vertical position, thus raising the stylus sufficiently for it to get over the obstruction. Then the spring pressure (as hereafter explained), an inward running groove, or other drive will move the arms and reproducer to the end of their inward travel and the member D² will be moved to the upright position by the projection J³ striking the pin D⁶ thus lifting the reproducer and permitting the outward movement of the parts by means of the cam acting wheel member D running upon its track L.

The journal N¹ on the screw spindle N is provided so that in case the pawl B⁶ should be reversed, it can always regain its proper hang by gravity in time to act at the end of the record.

The inward drive of the arm from the last sound groove may be effected by spring pressure as follows:—When the stylus gets near the end of the record the spring block K (Fig. 6) will be at the left-hand end of cam projection P¹ on the sleeve P and its pressure thereon will cause the arm to go towards the axis J² and by this means the screw will cause the machine to repeat as before described. The spring K will give no lateral pressure on the arm when the arm is in the outer positions.

In this form the outward drive of the arms and reproducer for repetition is caused by a spiral wall J⁴ on the under face of the turntable pushing against a spring mounted pin U on the arm B, which comes into contact therewith only when the arm B and reproducer are lifted by the cam wheel D² getting into the position shown by the dotted line D⁹, by the impact of the rotating arm J³.

When the arm B moves outwards sufficiently to put the stylus in the starting position on the record, the wheel D² will fall off the end L² of the slide L and swing back to the position shown in Figure 7, thus again lowering the arm B sufficiently to disengage the pin U from the wall J⁴, but not sufficiently to put the stylus on the record, so that the arm B will now rest on the slow fall part E¹ and let the stylus down slowly, when repetition will take place.

Figure 7A:
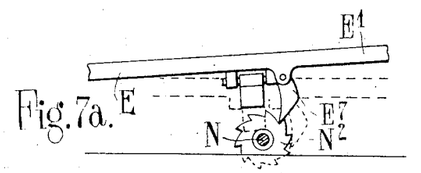

The slow fall acts as follows:—A lever E is pivoted on pin E³ on the bed plate at C⁴, and weighted at the left end (where a ratchet pawl E⁶ is mounted) so as normally to drop at this end. F² is a wormed spindle rotatable in the bearing C⁵ and the bed plate C. The pawl E⁶ catches under said worm so that the end E¹ of the lever E cannot be depressed without rotating said worm; this retards the fall. By another means a toothed wheel N² may be mounted on the outer end of the spindle N near the bearing C⁴ and a lever pivoted to bracket C⁵ (instead of the worm spindle) passing over the toothed wheel, after the manner of the lever E in Figure 6. Above the toothed wheel N², the lever carries a weighted free swinging pawl E⁷ (Figure 7ᵃ) which always catches the teeth of the wheel when a load is put on the outer end E¹, so that when the weight of the arms act on it they can only fall as the spindle turns, as shown by the dotted and solid lines in Figure 7ᵃ.

The repetition and brake indicator are operated by the movement of the quadrant S, each time one of its arms is pushed by the part B⁴ during the movement of the tone arm and arm B outwards. A pinion and rack drive is shown at Y in Figure 6 for the indicating lever.

The slide L works as described with reference to Figures 2 to 5.

When the arm A is lifted bodily it can be moved laterally without moving the arm B owing to the lugs A² being disengaged from the sleeve P. The lugs A² will keep the reproducer out of contact with the record, unless it is in its correct position in relation to arm B.

Also, if the tone arm A is moved an excessive distance around the tone arm axis, the V-shaped lugs A² will ride out of their rests in sleeve P, and thus raise the reproducer out of contact with the record and also prevent damage to the other parts.

Figures 9, 10:
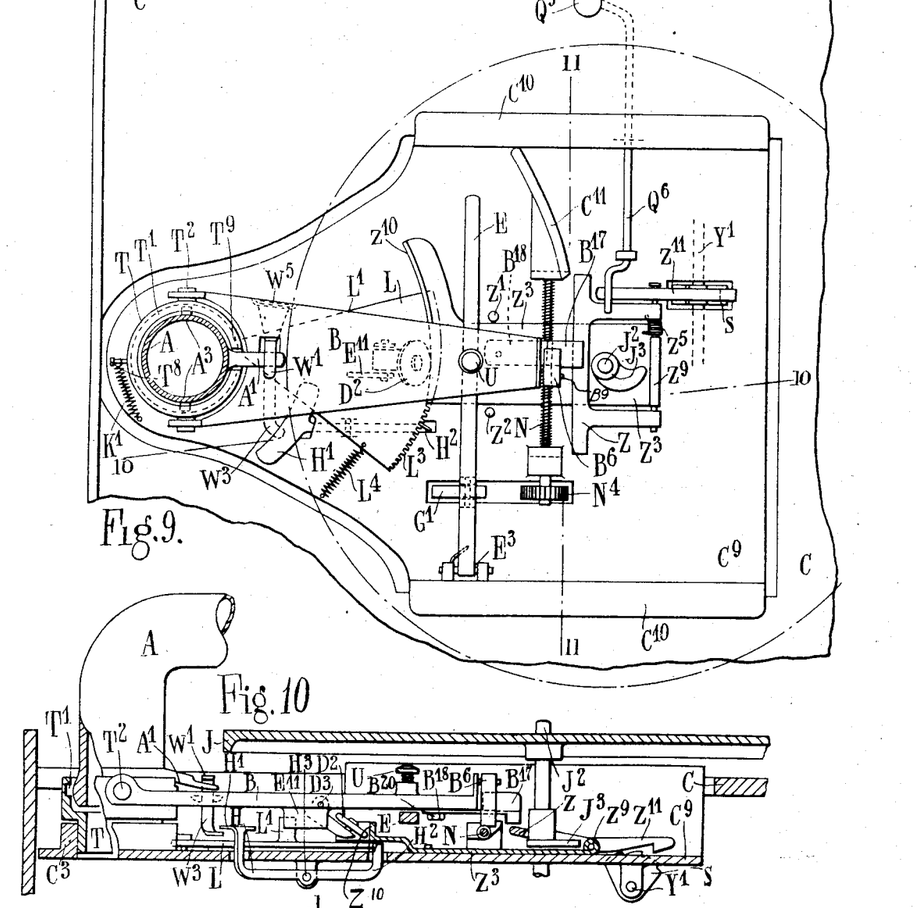
Figure 9 is a plan of a still further form of machine.
Figure 10 is a sectional side elevation (on line 10—10, Figure 9)
Figure 11:
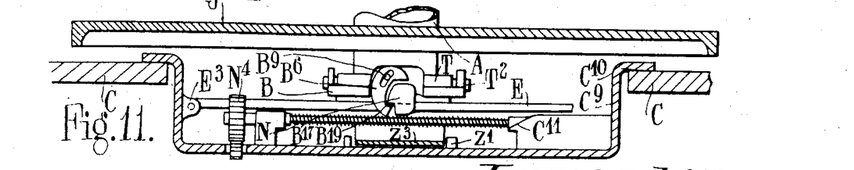
Figure 11 is a sectional front elevation (on line 11—11, Figure 9).

Figures 9 to 11 show a combination of features as previously described, specially adapted to form a construction suitable for commercial use.

The whole of the mechanism is mounted on a plate C⁹ which is shaped along two edges to hang by the flanges C¹⁰ in a suitable recess in the top of the wood case C.

The member T is mounted in a bearing C³ in the plate C⁹ to rotate freely in a similar plane therewith. In the top part of member T two bearing pins T² are fixed, and on these pins arm B is hinged to get vertical movement. The tone-arm A is mounted with the usual swivel cross pins A³ to work in an internal groove T¹ in the member T, and is capable of being locked against lateral movement in relation to arm B by the projection A¹ entering the recess T⁹ in member T when the arm A is lowered into the stylus working position.

The arm B (when lowered) rides on the arm E which keeps the outer end of arm B from falling below a predetermined height.

On the outer end of arm B, a pawl $B^6$ is mounted on pivot $B^9$ to act as a slipping ratchet pawl on the thread tops of the turning screw N (which works as described with reference to Figures 6 to 8 for example) when the arm B is carried inwards by the new movement of the tone arm, but when the reproducer stylus reaches the end of a record and arm B ceases to move inwards the turning screw N will catch up the pawl $B^6$ and push it gradually inwards until the catch edge $B^{19}$ is pulled from under the catch edge on the block $B^{17}$. The block $B^{17}$ is mounted on the very flexible spring $B^{18}$ which is fastened to arm B by the screw $B^{20}$ so that when the catch $B^{19}$ on the pawl $B^6$ (Figure 11) is withdrawn as above described, the block $B^{17}$ will fall into contact with and press down the bar Z which is hinged to a sliding plate $Z^3$ at $Z^9$ (Figures 9 and 10), the bar Z being normally held by the spring $Z^5$ so that it is above the path of the rotating cam shaped projection $J^3$ on the axle $J^2$, but when bar Z is pressed by means of the block $B^{17}$, the bar Z is brought into engagement with the edge of the cam $J^3$. The continued rotation of cam $J^3$ will push the bar Z and plate $Z^3$ inwards towards the tone arm axis so that the bent-up end $Z^{10}$ on plate $Z^3$ will push the roller $D^2$ (mounted by bearing $D^3$ on the under-side of the arm B) into an upright position. This will cause the arm B to cant upwards and press on the projection $A^1$ and thus raise the tone arm and reproducer ready for repetition. When the arm B is thus raised the pad U on the top side of arm B will be brought into friction contact with the under-side of the turntable J, the continued rotation of which will drive arms A and B outwards to the record commencement point, where the roller $D^2$ will drop over the edge of the adjustable plate L, and being free will fall back into its normal position (as $D^2$ Figure 10).

The arms A and B and reproducer are prevented from falling quickly by the under-side of the arm B being supported by the slow fall lever E, which is raised by a spring at the pivot $E^3$ to follow the rising arm B. A cam G' (Figure 9) working on the spring drum, slowly lowers the lever E and arms A and B in the same way as described with reference to Figures 1 to 5.

The light spring $K^1$ acts on the arms by a connection at $T^8$ to prevent the reproducer stylus sliding inwards towards the record axis when the inward record drive has ceased.

When the arms are driven outwards to repeat a record, the block $B^{17}$ will ride up the incline $C^{11}$ (Figure 11) and thus be set to the normal position ready for re-use; also the continued rotation of the cam member $J^3$ will press on the hinge part $Z^9$ on the plate $Z^3$ and press it back into its normal position when the spring $Z^5$ will reset the bar Z ready for re-use.

$Z^1$ and $Z^2$ are guide pins for plate $Z^3$ to insure a direct thrust to and from the tone arm axis.

The slide L is in the form of a quadrant pivoted near the tone arm axis and is moved, when setting, by the projection $E^{11}$ on the under-side of arm B pressing against the upright $L^1$ on the slide L, the slide L being latched at $L^3$ and $H^2$ by means of latch arm H as described with reference to Figures 1 to 5 with the exception that the projection $W^3$ is made to contact with part $H^1$ of the arm H instead of the arm B direct. The reason for this is that the raising of the reproducer and tone arm A will cause the bar $A^1$ to act on the lever $W^1$ (pivoted to arm B at $W^5$) so that a $\frac{1}{16}''$ movement of $A^1$ will raise the end $W^3$ about three times as far and thus ensure more sensitive action when setting the apparatus for a new record.

The wire link $Q^6$ and button $Q^5$ are for the purpose of actuating the reproducer lifting mechanism at any time, independent of whether the reproducer is at the end of a record. The act of pressing the button $Q^5$ causes the wire $Q^6$ to revolve slightly and thus depress the bar Z when the lifting action takes place as above described.

The pawl $Z^{11}$ acts on the toothed quadrant S one tooth each time the mechanism is actuated by the pawl $B^6$, and thus turns the spindle $Y^1$ to control the number of times the machine is to repeat, the spindle $Y^1$ being connected to suitable control mechanism.

Of course it will be understood that my improved automatic repeating and stopping apparatus can be applied to various types of disc talking machines, and that details can be varied, omitted, interchanged or multiplied to suit requirements.

Having now described my invention what I claim as new and desire to secure by Letters Patent is:—

1. In a talking machine and the like having a tone arm, reproducer and motor driven record support, automatic repeating apparatus comprising an auxiliary arm attached to the tone arm so as to be movable therewith while being below the record support, an elevator adapted to move the auxiliary arm to lift the reproducer out of contact with the record, and means operated by the continued inward travel of a part of the auxiliary arm on the cessation of inward movement of the reproducer by the record grooves to actuate said elevator.

2. In a talking machine and the like having a tone arm, reproducer and motor driven record support, automatic repeating apparatus comprising an auxiliary arm attached to the tone arm so as to be movable therewith while being below the record support, a part connected to normally move with the auxiliary arm, an elevator adapted to move the auxiliary arm to lift the reproducer out of contact with the record together with means to return the reproducer outwards to the record commencement position, means operated by the continued travel of the said part after the said reproducer and tone arm has ceased to be moved inwards by the record groove at the completion of the sound reproduction to actuate the elevator automatically without previous special setting of the parts to suit the record being used.

3. In a talking machine and the like having a tone arm, reproducer and motor-driven record support, automatic repeating apparatus comprising an auxiliary arm attached to the tone arm so as to be movable therewith while being below the record support, and means located beneath the record support for lifting and returning said auxiliary arm for the automatic repetition of a record including a rolling part operated on the discontinued inward movement of the reproducer by the record grooves, and a member permanently located in relation to the record support axis for actuating the rolling part.

4. In a talking machine and the like having a tone arm, reproducer and motor driven record support, automatic repeating apparatus comprising an auxiliary arm attached to the tone arm so as to be movable therewith while being below the record support, a cam acting elevator adapted to move the auxiliary arm to lift the reproducer out of contact with the record when said elevator is actuated by the continued inward travel of a part on the auxiliary arm, a member permanently located in relation to the record support axis for operating said elevator, and a track for facilitating outward movement of said arm for returning the reproducer to the record commencing position.

5. In a talking machine and the like having a tone arm, reproducer and motor driven record support, automatic repeating apparatus comprising an auxiliary arm attached to the tone arm so as to be movable therewith while being below the record support, a cam acting elevator adapted to move the auxiliary arm to lift the reproducer out of contact with the record when said elevator is actuated by the continued inward travel of a part on the auxiliary arm, a member permanently located in relation to the record support axis for operating said elevator, a track for facilitating outward movement of said arm for returning the reproducer to the record commencing position and means for adjusting said track for varying sizes of records.

6. In a talking machine and the like having a tone arm, reproducer and motor driven record support, automatic repeating apparatus comprising an auxiliary arm attached to the arm so as to be movable therewith while being below the record support, a cam acting elevator adapted to move the auxiliary arm to lift the reproducer out of contact with the record when said elevator is actuated by the continued inward travel of a part on the auxiliary arm, a member permanently located in relation to the record support axis for operating said elevator, means actuated by the record support for moving said auxiliary arm outwards to return the reproducer to the record commencement position and means for gently lowering the reproducer into contact with the record when moved to the record commencement position.

7. In a talking machine and the like having a tone arm, reproducer and motor driven record support, automatic repeating apparatus comprising an auxiliary arm attached to the tone arm so as to be movable therewith while being below the record support, a cam acting elevator adapted to move the auxiliary arm to lift the reproducer out of contact with the record when said elevator is actuated by the continued inward travel of the auxiliary arm, a member permanently located in relation to the record support axis for operating said elevator, means for moving said auxiliary arm outwards to return the reproducer to the record commencement position, a track with which such elevating means is made to contact, a pawl adapted to produce contact between the elevating means and track, said pawl travelling with the auxiliary arm and engaging a slow turning screwed spindle when the reproducer ceases to travel inwards and means adjustable in a radial direction to the record support axis to release said elevator at the desired repetition position to disengage the reproducer returning means and at the same time to engage means for gently replacing the reproducer in contact with the record.

8. In a talking machine and the like having a tone arm, reproducer and motor driven record support, automatic repeating apparatus comprising an auxiliary arm attached to the tone arm so as to be movable therewith and located beneath the record support, a slow turning threaded spindle driven from the record support driving means, means to elevate said arms, a pawl connected with said auxiliary arm engaging said threaded spindle to actuate the means to elevate the said auxiliary arm when said arm ceases to be fed inwards by the record grooves and means for moving said arm outwards when in its elevated position.

9. In a talking machine and the like having a tone arm, reproducer and motor driven record support, automatic repeating apparatus comprising an auxiliary arm attached to the tone arm so as to be movable therewith and located beneath the record support, a slow turning threaded spindle driven from the record support driving means, means to elevate said arm, a pawl connected with said auxiliary arm and engaging said threaded spindle to actuate the means to elevate the said auxiliary arm when said arm ceases to be fed inwards by the record grooves, means for moving said arm outwards when in its elevated position and means for gently lowering the reproducer into contact with the record when moved into the record commencement position.

10. In a talking machine and the like having a tone arm, reproducer and motor driven record support, automatic repeating apparatus comprising an auxiliary arm attached to the tone arm so as to be movable therewith and located beneath the record support, an elevator adapted to lift said auxiliary arm when the latter ceases to be fed inwards by the record grooves, a cam for actuating the elevator, a spindle for actuating said cam, a slow turning threaded spindle and a pawl adapted to co-operate with the slow turning threaded spindle for bringing said cam into operation.

11. In a talking machine and the like having a tone arm, reproducer and motor driven record support, automatic repeating apparatus comprising an auxiliary arm attached to the tone arm so as to be movable therewith and located beneath the record support, an elevator adapted to lift said auxiliary arm when the latter ceases to be fed inwards by the record grooves, a cam for actuating the elevator, a spindle for actuating said cam, a slow turning threaded spindle, a pawl adapted to co-operate with the slow turning threaded spindle for bringing said cam into operation and means for moving said arm outwards when in its elevated position to bring the reproducer to the record commencement position.

12. In a talking machine and the like having a tone arm and reproducer and motor driven record support, automatic repeating apparatus comprising an auxiliary arm attached to the tone arm so as to be movable therewith and located beneath the record support, an elevator adapted to lift said auxiliary arm when the latter ceases to be fed inwards by the record grooves, a cam for actuating the elevator, a spindle for actuating said cam, a slow turning screwed spindle, a pawl adapted to co-operate with the slow turning screwed spindle for bringing said cam into operation, means for moving said arm outwards when in its elevated position to bring the reproducer to the record commencement position, and means for gently lowering the reproducer into contact with the record.

13. In a talking machine and the like having a tone arm and reproducer and motor driven record support, automatic repeating apparatus comprising an auxiliary arm attached to the tone arm so as to be movable therewith and located beneath the record support, means actuated to elevate said arm when the latter ceases to be fed inwards by the record grooves, means for moving said arm outwards to the record commencement position, a track for facilitating outward movement of said arm and means for adjusting said track for different sizes of records.

In testimony whereof I have signed my name to this specification.

FRANK BOWLEY MITCHELL.